(No Model.) 3 Sheets—Sheet 1.
J. F. SEIBERLING.
MOWING MACHINE.
No. 485,891. Patented Nov. 8, 1892.
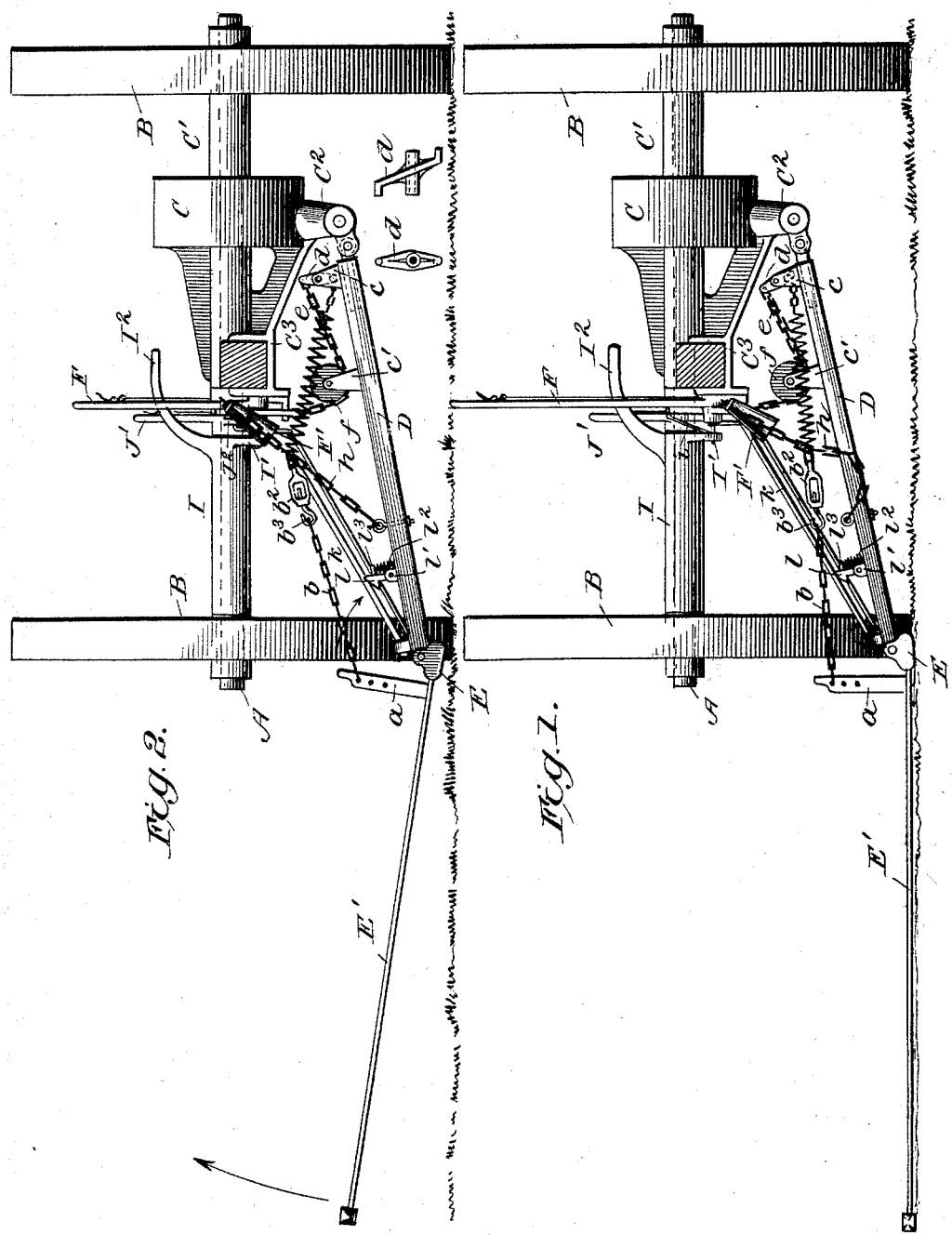
Witnesses
N. J. Collamer,
D. E. Sauer.
Inventor,
John F. Seiberling
By his Attorneys A. W. Smith & Son
THE NORRIS PETERS CO., PHOTO-LITHO., WASHINGTON, D. C.

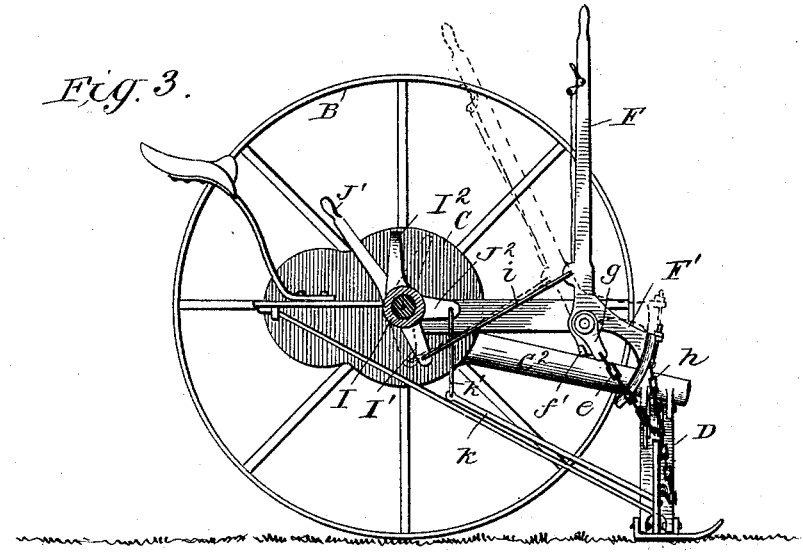
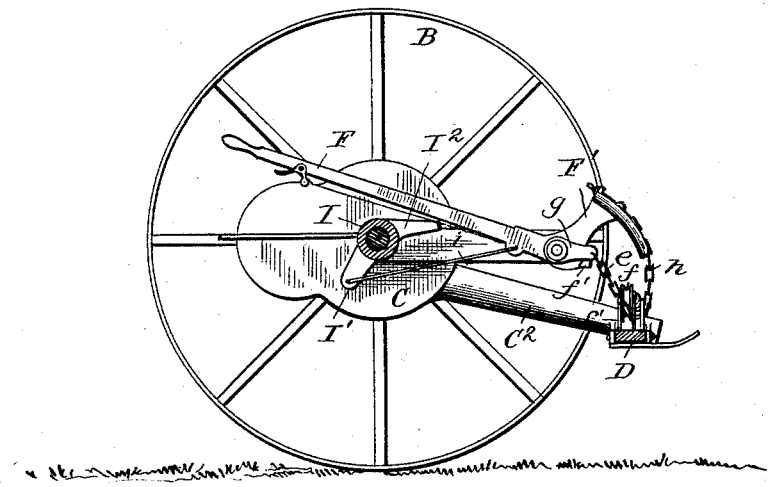

(No Model.) 3 Sheets—Sheet 3.
J. F. SEIBERLING.
MOWING MACHINE.
No. 485,891. Patented Nov. 8, 1892.
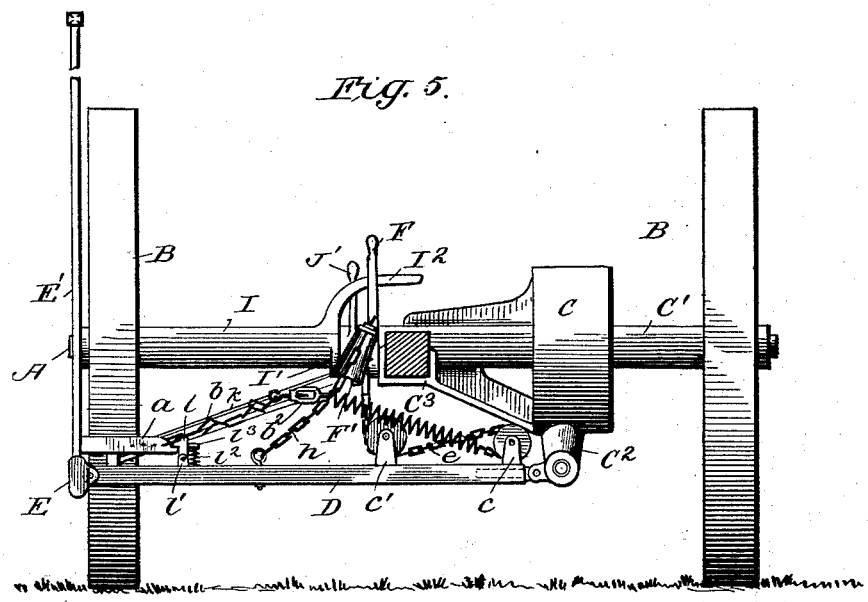
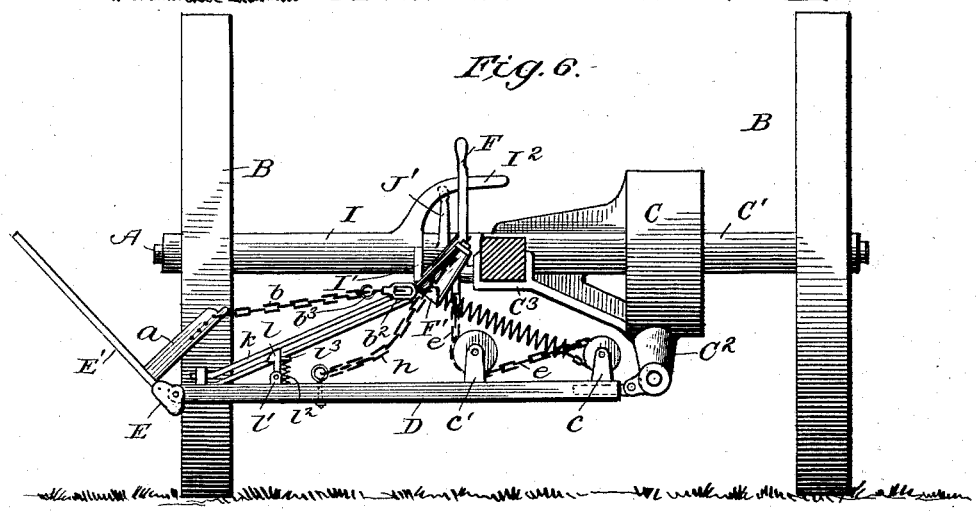
WITNESSES:
INVENTOR:
John F. Seiberling
BY
ATTORNEYS

UNITED STATES PATENT OFFICE.

JOHN F. SEIBERLING, OF AKRON, OHIO.

MOWING-MACHINE.

SPECIFICATION forming part of Letters Patent No. 485,891, dated November 8, 1892.

Application filed March 21, 1892. Serial No. 425,746. (No model.)

*To all whom it may concern:*

Be it known that I, JOHN F. SEIBERLING, a citizen of the United States, and a resident of Akron, county of Summit, and State of Ohio, have invented a new and useful Improvement in Mowing-Machines, of which the following is a full, clear, and exact description, reference being had to the accompanying drawings, making part of this specification.

My invention relates to the means for relieving the drag of the cutting apparatus and supporting, in great part, the weight thereof at both its inner and outer ends in such manner as to cause it to rest and move lightly and easily over the surface of the ground, at the same time throwing additional weight on the driving-wheels and increasing the traction thereof.

It consists in a novel construction and arrangement of flexible connections between the inner end of the hinged cutting apparatus and the inner end of the hinged coupling-arm and between said coupling-arm and hinged connection and the lifting-lever, enabling the driver by the movement of the one lever to raise both the inner and the outer end of the cutting apparatus or the outer end only, as may be required, for passing an obstruction, turning corners, or relieving the drag of the cutting apparatus on the ground; also in a novel arrangement of treadle operating in connection with said lifting-lever, &c., and constituting an improvement upon the device for the above purpose embraced in Letters Patent granted to me June 7, 1892, Patent No. 476,318.

In the accompanying drawings, Figure 1 is a front elevation of a machine embracing my improvements, with the parts in operative position, also showing detail views of the flexible-connection lever. Fig. 2 is a similar view with the finger-bar raised at its outer end and slightly raised at its inner end. Fig. 3 is a side elevation with the parts in the position shown in Fig. 1, and Fig. 4 is a similar elevation with the finger-bar raised and in section to show the lifting devices. Figs. 5 and 6 are front elevations showing a modification in the arrangement of the flexible connection, Fig. 5 also showing the finger-bar locked in folded position for transportation.

A indicates the main axle, B B the driving-wheels journaled thereon, and C the main frame supported on the axle by means of a sleeve $C'$ and having a forwardly-extending sleeve $C^2$, in which the crank-shaft is journaled, and a pole-socket $C^3$.

D indicates the coupling-arm pivoted at its inner end to the crank-shaft sleeve near its forward end and to the outer end of which the inner shoe E, carrying the cutting apparatus, is hinged, said parts being constructed and arranged in a well known manner.

The finger-bar $E'$ has an upright $a$, rigid on its inner end, provided near its upper end with a series of eyes or perforations, through any one of which it may have connected with it one end of a chain, cord, or other flexible connection $b$, connected at its other end with the lower arm of a lever $d$, pivoted between upright lugs or ears $c$ on the inner end of the coupling-arm. A portion $b'$ of this flexible connection is made in the form, preferably, of a spiral spring, and between said spring portion and the chain $b$ is interposed an elongated link $b^2$, provided with an adjustable hook $b^3$, having a screw-threaded shank, by the adjustment of which the tension of the spring $b'$ can be regulated, as desired. The lever $d$ extends on both sides of its pivotal center and preferably has its arms set obliquely thereto, as shown in the detached view, Fig. 1, to permit the chains connected with its ends to pass by each other without frictional contact. The upper end of this lever has one end of a chain or cord $e$ connected with it, said chain passing thence under a grooved pulley $f$, journaled in bearings $c'$ on the coupling-arm D, near the longitudinal vertical plane of a lifting-lever F on the pole or pole-socket arm, the cord $e$ extending up to and being connected with an arm $g$, carried by the lifting-lever. The arm $g$ may be mounted either on the same pivot as the lever F or on a separate pivot on the lever itself near the pivot of the latter, as preferred, and when the cutting apparatus is in operative position is drawn into line with the portion of chain $e$ connected therewith, as shown in Fig. 3. The lever F is provided on its heel extension or quadrant-arm $F'$ with a laterally-projecting spur $f'$ in rear of the arm $g$, which when the lever is swung backward into the position shown in dotted lines, Fig. 2, engages the arm g, which is then carried by the lever in its further movement and serves, through the chain e, lever d, and flexible connection b, to increase the tension of the latter on the post a for lifting the outer end of the cutting apparatus.

A cord or chain h connects the lifting-lever quadrant with the flexible connection b near the center of its length and extends thence to the coupling-arm D, to which its lower end is connected. The portion of the chain h connecting the flexible connection b with the coupling-arm is slack when the parts are in operative position, as shown in Fig. 1; but when the lifting-lever is vibrated to raise the cutting apparatus the flexible connection b is deflected upward, increasing the tension on the post a and lifting the outer end of the cutting apparatus until the slack in the lower portion of the chain h is taken up, when it acts directly on the coupling-arm and serves to lift the inner end of the cutting apparatus also, as shown in Figs. 2 and 5.

In Figs. 5 and 6 a grooved pulley d' is substituted for the lever d, and in this case the chain e forms an extension merely of the flexible connection b, passing around said pulley and connecting with the arm g, as before.

The axle A on its end adjacent to the grain-side wheel has a sleeve I journaled on it, provided with a pendent arm l', from which a rod or link i extends to the lifting-lever, as shown. The sleeve I has an angular or curved arm I², rigid on its inner end, the horizontal portion thereof forming a treadle extending within convenient reach of the driver's foot in such manner that when the latter has his hands employed in guiding the team or otherwise he can operate the lifting-lever to raise or lower the cutting apparatus with his foot.

Between the frame C' and the treadle-sleeve I is a short sleeve J, also journaled on the axle and provided with an upright lever J' and a forwardly-extending arm J² from which a rod or link k' extends downward to an arm or bar k, rigidly connected at its forward end to the coupling-arm in such manner that by vibrating the lever J' the cutting apparatus will be rocked on its longitudinal axis, in a manner well understood.

The coupling-arm D is provided near its outer end with suitable lugs or ears l', in which the lower end of an upright latch is pivoted in position and of suitable form to engage the free end of the standard a, when the cutting apparatus is folded into an upright position for transportation, &c., as shown in Fig. 5. A spring l² is interposed between the coupling-arm and a spur l³ on the back of the latch l for causing the latter to engage the standard and lock the cutting apparatus in its folded position.

Having thus described my invention, what I claim as new, and desire to secure by Letters Patent, is—

1. The hinged coupling-arm, the finger-bar hinged thereto, and the lifting-lever, in combination, with a flexible and elastic connection between said finger-bar and lever, a pivoted support for said connection on the inner end of the coupling-arm, and a cord or chain connecting the lifting-lever with said flexible connection at a point intermediate the said support and the finger-bar, substantially as described.

2. The combination of the hinged coupling-arm, the finger-bar hinged thereto and having a rigid standard on its inner end, a lifting-lever, and a flexible elastic connection between said standard and lever, a pivoted support on the inner end of the coupling-arm, through which said connection extends to said lever, the lever being further connected with said flexible connection at a point intermediate the pivoted support and the finger-bar, substantially as described.

3. The combination, with the hinged coupling-arm and the finger-bar hinged thereto, of a standard rigid on the inner end of said bar, a flexible elastic connection extending from said standard to a pivoted support on the inner end of the coupling-arm, a connection between said support and the lifting-lever, and the lifting-lever connected to said flexible connection and coupling-arm at points intermediate their ends, substantially as described.

4. The combination, with the hinged coupling-arm, the finger-bar hinged thereto, and the lifting-lever, of a pivoted arm and a stop therefor carried by said lever, a flexible and elastic connection between said arm and the coupling-arm and finger-bar, and a connection between said lifting-lever and flexible connection intermediate the ends of the latter, substantially as described.

5. The combination, with the hinged finger-bar and coupling-arm, of the lifting-lever and the pivoted arm and the stop therefor on said lever, the flexible and elastic connection between said pivoted arm and the coupling-arm and finger-bar, the connection between the lifting-lever and said flexible connection intermediate the ends of the latter, and the treadle located back of the lifting-lever and connected to said lever and through the latter with said flexible connection, substantially as described.

In testimony whereof I have hereunto set my hand.

JOHN F. SEIBERLING.

Witnesses:
W. H. CARTER,
A. L. DICKINSON.